Nov. 26, 1929.   C. P. BROCKWAY   1,737,356
FEEDING MECHANISM
Filed Oct. 18, 1922   2 Sheets-Sheet 1
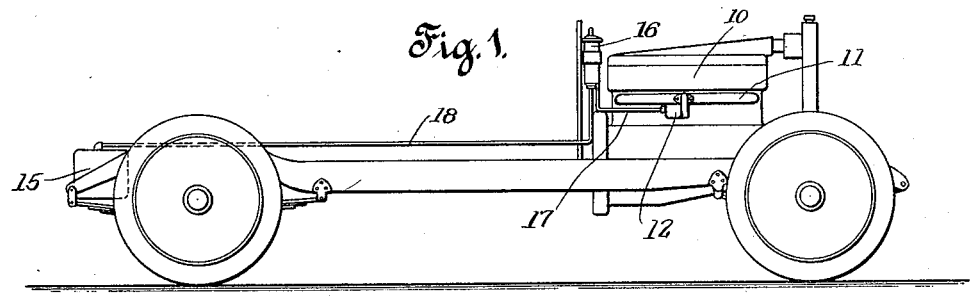
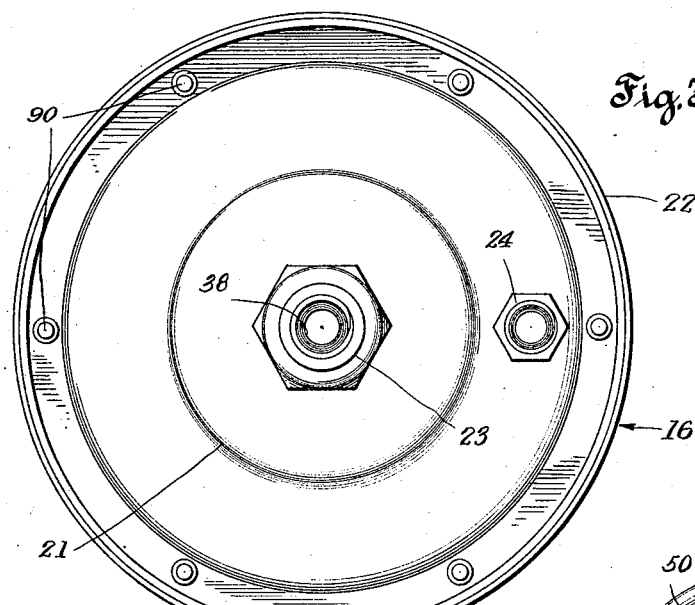
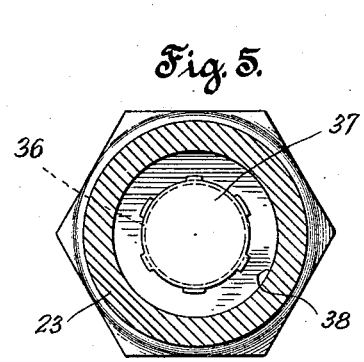
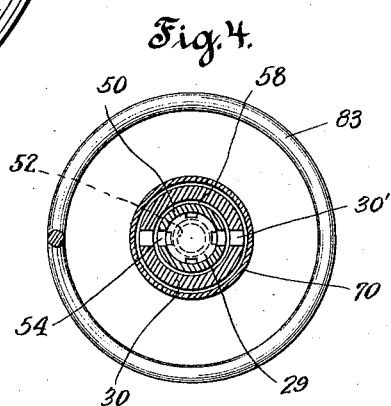
INVENTOR
Carl P. Brockway
By Chester W. Bieselen
Attorney

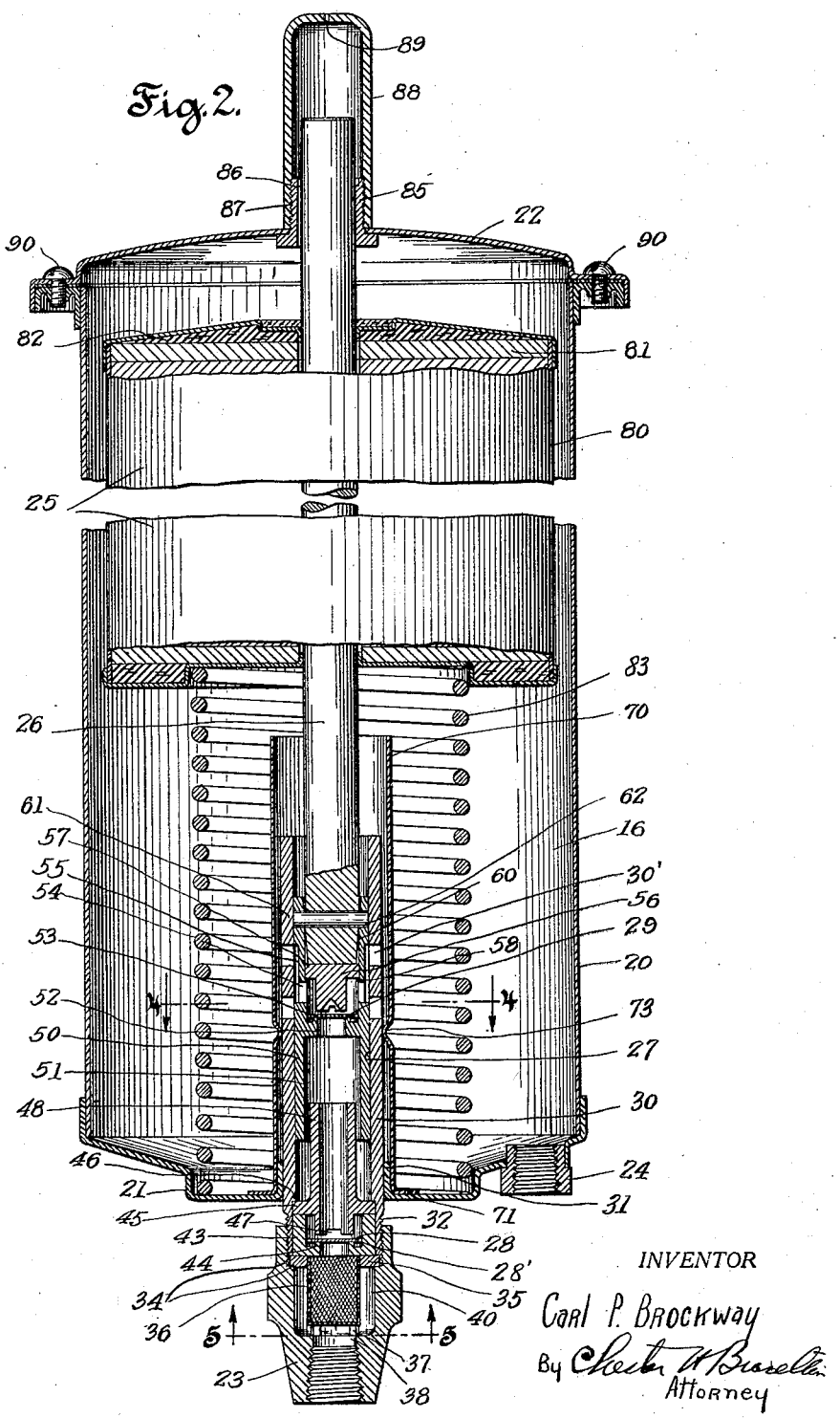

Patented Nov. 26, 1929

1,737,356

UNITED STATES PATENT OFFICE

CARL P. BROCKWAY, OF TOLEDO, OHIO, ASSIGNOR TO CHESTER H. BRASELTON, OF NEW YORK, N. Y.

FEEDING MECHANISM

Application filed October 18, 1922. Serial No. 595,241.

The present invention relates to improvements in liquid pumping mechanism and has to do, more particularly, with liquid pumping mechanism of the type adapted to be actuated by vibration, for pumping liquid from a source of supply to a receiving tank at a higher level. This invention is particularly useful in connection with fuel supply systems for motor vehicles, in which the pumping mechanism may be actuated by the vibration normally inherent in the motor vehicle when in operation to pump liquid fuel from a low level supply tank to a receiving tank at a higher level, from which the fuel is fed as needed to the charge forming device of the vehicle motor.

The present invention is an improvement upon the inventions described and claimed in the pending applications for United States Letters Patent of Chester H. Braselton and Fred B. MacLaren, Serial No. 533,493, filed Feb. 1, 1922, fuel supply system for automotive vehicles, Serial No. 531,137, filed Jan. 23, 1922, fuel supply system for automotive vehicles, Serial No. 532,193, filed Jan. 27, 1922, vibration operated pumps, Serial No. 532,718, filed Jan. 30, 1922, inertia pumps, Serial No. 537,681, filed Feb. 20, 1922, pumping mechanism and Serial No. 575,886, filed July 18, 1922, level maintaining means in a pumping system, and the application of Chester H. Braselton, Serial No. 566,380, filed June 6, 1922, liquid supply systems. Certain of the features disclosed and not claimed in this application are disclosed and claimed in one or more of the above mentioned applications, to which cross-reference is hereby made.

One of the objects of the present invention is to provide a liquid pumping mechanism of the kind described which is particularly efficient in operation, employs but few parts, requires only simple assembling operations and may be constructed very cheaply and easily. A further object of this invention is to provide a vibration-actuated pumping mechanism so constructed as to compensate for inaccuracies in assembly or manufacture and requiring less care in aligning and assembling the various parts than the constructions disclosed in the various pending applications referred to above.

A further object of the present invention is to provide a vibration actuated pumping mechanism in which motion is transmitted from the piston-actuating mass to the piston by a piston rod which is suitably guided and connected to the piston so as to permit angular displacement of the rod relative to the piston to compensate for inaccurate alignment of the parts in assembly or manufacture.

Another object of the present invention is to provide improved and simplified means for controlling the level of liquid in the receiving tank by automatically checking the pumping action when the liquid reaches a certain level in the tank.

A further object of the present invention is to provide means for utilizing the liquid displaced by the piston-actuating mass, when the liquid in the tank reaches the level of said mass, to change the locus of movement of the piston so as to reduce or cut off the discharge from the pump.

A further object of the present invention is to provide simple and effective means for maintaining a reserve supply of liquid in the tank which can not drain from the tank in case of leaky valves in the pumping mechanism.

A further object of the present invention is to provide an improved and simplified valve construction of such a nature as to facilitate the assembly and removal of the various parts of the pumping mechanism.

Further objects, and objects relating to details and economies of operation and construction, will definitely appear from the detailed description to follow. In one instance, the objects of the invention are accomplished by the devices and means described in the accompanying specification. The invention is clearly defined and pointed out in the appended claims. A structure constituting a preferred embodiment of the invention is illustrated in the accompanying drawing, forming a part of this specification, which represents a vertical, sectional view through the receiving tank and pumping mechanism.

In the construction of vibration actuated liquid pumping mechanism of the character shown in the pending applications above referred to, it has been found highly desirable to guide the piston and the piston-actuating mass in substantial alignment with the pump chamber or cylinder in which the piston works. This has required very great care in the manufacture and assembly of the parts of the mechanism to make sure that this alignment is secured. One of the purposes of the present invention is to provide a construction such that the necessity for such great care is removed. In order to accomplish this purpose, it is proposed to secure the piston-actuating mass to a piston rod which is connected to the piston by a joint such as to permit angular displacement of the rod relative to the piston, so that the axes of the piston rod and the piston do not need to be in exact alignment. A suitable guide is provided for the piston rod and this guide is preferably independent of the mass, that is to say, the piston rod works in a suitable guide instead of providing a guide in which the mass connected to the piston rod works. It is proposed to provide the guide for the piston rod at the top of the tank and a convenient arrangement for this purpose consists of a guide sleeve carried by the top or cover of the tank, in which the upper end of the piston rod is slidably mounted. The piston-actuating mass may be connected to the piston rod between the guide and the joint connecting the rod to the piston. Another feature of the present invention resides in the construction of the piston-actuating mass, which is such as to reduce the cost of construction considerably. A containing shell is provided which contains a plurality of metallic elements, such as pieces of sheet metal, which may be made from scrap, as their only function is to give the necessary weight to the piston-actuating mass. The shell is connected to the piston rod in any convenient way, for instance, the rod extends axially through and is secured to the containing shell.

In pumping mechanism of this character, it is desirable to provide a level control by which the pumping action is modified or checked when the liquid in the tank reaches a predetermined level. In the present instance, this is accomplished by selecting a supporting spring of such characteristics and a piston-actuating mass of such weight per unit of volume that, when the liquid rises in the tank to the level of the mass so that some of the liquid is displaced by the mass, the weight of the liquid is placed by the mass, which assists the spring in supporting the mass, changes the locus of movement in which the mass oscillates when the tank is subjected to vibration. The locus of movement of the piston changes with that of the mass and this change may be utilized to vary or reduce the discharge from the pump chamber. A convenient means for accomplishing this consists in providing a discharge port in the wall of the pump chamber, which is normally in full cooperative relationship with a discharge passage in the piston. This port may be so located that the change in the locus of movement of the piston shifts the discharge passage, either partially or completely, out of cooperative relationship with the discharge port. In either case, the discharge from the pump is reduced and this condition continues until the fall of the liquid level in the tank permits a shift in the locus of movement of the piston sufficient to bring the port and passage into full cooperative relationship once more. Other features of the present invention consist in the construction of the piston and the inlet and discharge valves by which the assembly of the parts is made easier and the cost reduced, as will appear more fully hereinafter.

Referring to the drawing, in which one advantageous embodiment of the present invention is illustrated, a cylinder 20, preferably of sheet metal, forms the wall of the tank 16, said cylinder being provided with a bottom 21 and a top 22. The screw threaded nipple 23 connects the tank to the supply line while the outlet 24 from the tank is connected to the pipe leading to the carburetor. Located within the tank 16 is an inertia operated pumping mechanism actuated by the vibration of the vehicle on which it may be mounted for causing relative movement of piston and pump chamber to draw liquid from the supply tank and deliver the same into the tank 16.

As one simplified construction for attaining the objects of the present invention, there is illustrated herein a piston-actuating mass 25 and the piston 27 which reciprocates in the pump chamber, the latter having an inlet valve 28 and an outlet or discharge valve 29 carried, in this instance, by the piston 27. The shell 30 fits within and is secured to an inwardly turned flange 31 in the bottom 21 of the tank 16, said shell or cylinder forming the pump chamber and a guide for the piston. The shell 30 extends through the bottom of the tank and is screw threaded at its lower end, as indicated at 32, upon which end the nipple 23 is connected as illustrated. At the bottom of the threaded end 32, an internal shoulder 34 is provided to form a seat for a ring 35, within which the upper end of the strainer 36 is located, the bottom of which rests on a strainer seat 37 supported on the ledge 38, as shown, to permit the passage of gasoline from the supply pipe into the chamber 40 in the nipple 23 and through the strainer 36. An inlet valve member 43 is engaged by the ring 35 as shown within the shell 30 and is provided with the valve seat 44 upon which the check valve 28 seats, as indicated. It will be understood that the check valve 28 is provided with notches or a space 28' at the edges thereof to permit passage of gasoline around the edge of the valve past the valve seat when it is lifted from the seat. A tubular valve check fits within the shell 30 and has a flange 45 which fits between the upper end of the valve member 43 and a shoulder 46 formed in the inner surface of the shell 30, as illustrated. The lower end of the valve check 45 is provided with notches 47, as indicated, so that, when the valve 28 is lifted so that the upper surface thereof contacts with the lower end of the valve check, gasoline may pass through the notches 47 and through the passage 48 in the valve check, into the pump chamber formed by the shell 30. It will be seen that when the parts just described are assembled with the flange 45 of the valve check against the shoulder 46 and the strainer ring 35 resting on the internal shoulder 34 and engaged by the nipple 23, all parts are held rigidly in place. This construction facilitates the assembly of the inlet valve and reduces the cost thereof.

The piston discharge valve and piston rod connection will now be described. The piston 50 is in the form of a hollow member having the relatively long piston skirt 51, engaging the walls of the pump chamber formed by shell 30 and having a transverse partition provided with an opening 52 and an integral valve seat 53, as shown, with which the valve 29 cooperates. The piston 50 above this valve seat is provided with the piston outlet ports 54, the outer surface of the piston being cut away, as indicated at 55, to form an annular passage through which the liquid may pass. Suitable discharge ports 30' in the wall of the shell 30 cooperate with the groove or passage 55 to form a discharge passage through which liquid may flow to the interior of the tank 16, as will hereinafter appear. The valve check 56 for the discharge valve is provided with a flange 57 to rest on a ledge 58 formed on the interior surface of the piston 50. The valve check 56 is held in place against this ledge by contact therewith of the lower end of the piston rod 26, as shown.

The universal connection between the piston 50 and the piston rod 26 will now be described. This simplified connection consists in providing the lower end of the piston rod 26 with a taper 60, said end being inserted in the piston and connected by a pin 61 to the piston 50 as shown. From the center of the opening 62 in the piston 50, which receives the pin 61, the upper inner bore of the piston 50 is tapered divergently to provide a slight space between the lower end of the piston rod 26 and the walls thereof. It will be seen that, by reason of this space and by reason of the taper, a space is provided above and below the center of the pin 61, between the inner wall of the hollow piston 50 and the piston rod, to permit a slight angular displacement of the piston rod relative to the piston. This gives a substantially universal movement.

Means are provided to insure the maintaining of a certain supply of gasoline in the tank 16 which cannot return to the main supply tank in case the valves should leak, and, to this end, a hollow metal tube 70 is secured in the tank as shown, by providing the same with a flange 71, at the bottom thereof, fitting over the inturned flange 31 on the bottom 21 heretofore described. The member 70 may be provided with an internal rib 73 to contact with the exterior of the shell 30 and position the same, as will be apparent. The tube 70 is spaced from the shell or cylinder 30 so as to permit the gasoline or other fuel to pass upward between the outer wall of the shell 30 and the tube 70 and over the top thereof into the tank 16. This tube 70 forms a well within which the pump chamber is located.

In the particular embodiment shown herein, the piston-actuating mass, which is actuated by inertia to operate the pumping mechanism, comprises a containing shell 80 which may be filled with suitable metallic elements 81, held in place by any suitable composition 82 such as what is known as a battery compound. The metallic elements 81 are pieces of sheet metal which may, for instance, be made of scrap metal as their function is merely to give the necessary weight to the piston-actuating mass. The specific gravity of the piston-actuating mass is such that as the liquid in the tank rises the weight of the liquid displaced by the mass 25, when the liquid in the tank rises to a level of the mass, assists the spring in supporting the mass at a new point of balance with respect to which the mass oscillates. It will be understood that a spring 83 is located conveniently, for instance, as shown to support and balance the mass 25 to permit a proper actuation of the pumping mechanism. The upper end of the rod 26 extends through a guide 85, which may be carried by the top 22, as shown, the same being provided with a vent passage 86 and screw threads 87 to form a convenient means for attaching the end cap 88, which is likewise provided with a vent 89. The top 22 is removably connected to the upper end of the wall of the tank 16 by the screws 90, as shown. The guide 85, or a portion of the rod 26, may be formed of a suitable friction reducing material, such as a composition of matter embodying graphite and bakelite.

*Operation*

Upon vibration being imparted to the tank or its support, the inertia of the piston-actuating mass causes a movement of the piston 50, as will be understood, so that on the up stroke of the piston gasoline is drawn through the supply pipe 18 into the nipple 23, past the strainer 36, inlet valve 28 and into the lower portion of the pump chamber. Upon reversal of the stroke of the piston, the inlet valve 28 closes and the liquid is forced past the discharge valve 29, which opens by reason of the pressure, as will be understood, passes through the openings 54 in the piston and the discharge ports 30' in the shell or cylinder 30, and rises in the tube 70, flowing over the top thereof into the tank 16. From thence it may be fed as needed, by gravity, to the charge forming device.

The characteristics of the piston-actuating mass 25 and the spring 83 are such that, when the liquid rises in the tank 16 to the level of the mass so that some of the liquid is displaced by the mass, the weight of the liquid displaced by the mass is added to the tension of spring 83 as a force supporting the mass. The result is that the mass is supported at a new point of balance and its locus of movement is changed. The piston is connected to the mass and, therefore, its locus of movement is also changed. This shift in the locus of movement of the piston 50 gradually shifts the annular passage 55 in the piston wall out of cooperative relationship with the discharge ports 30' through the wall of the pump chamber so as to reduce and finally cut off the discharge from the pump chamber. At first, the discharge is cut off only during a part of the piston stroke but, as the locus of movement of the piston shifts upwardly due to continued rise of liquid in the tank, the discharge is cut off during a larger part of the piston stroke and this may continue until the discharge is completely cut off. This serves to check the pumping action, not only because the discharge from the pump chamber is lessened so that less liquid is discharged into the tank, but also because the liquid trapped in the pump chamber, upon the cutting off of the discharge port, serves as a buffer or damper opposing the discharge stroke of the piston and tending to bring it to rest. The result is that the discharge of liquid in the tank is lessened or cut off until the level of the liquid falls and permits the normal pumping operation to be resumed. This makes a very efficient and practical level control for the pumping mechanism.

The joint between the piston 50 and the piston rod 26 is such that it is not necessary for the guide 85 to be in exact alignment with the piston and if this guide is out of alignment either temporarily or permanently the universal connection between the piston and piston rod will permit continued efficient operation of the pumping mechanism. This is a feature of considerable importance from the manufacturing standpoint as it lessens the amount of precision necessary in manufacturing and assembling the parts.

It is to be noted that the tube 70 forms a well in which the pump chamber is located. This tube prevents liquid running back through the pump from the lower half of the tank 16, in case the valves should be leaky, and hence acts as a safeguard to maintain a substantial supply of liquid in the tank which cannot leak from the tank through the valves.

By unscrewing the nipple 23 the strainer, valve member 43, and tubular valve check may be removed quickly and easily. This facilitates the cleaning or inspection of the strainer and inlet valve and also the assembly of these parts in manufacture. Similarly, the valve check 56 is held in the piston by the lower end of the piston rod 26 and these parts can be assembled conveniently and expeditiously and held in assembled relation by driving home the pin 61 which connects the piston rod to the piston. The piston construction is such that it can be easily manufactured and it lends itself particularly well to its connection with the piston rod by a joint permitting angular displacement of the rod relative to the piston.

It is apparent that, within the spirit and scope of the invention, various modifications and changes of construction and arrangement of parts may be made other than as herein disclosed, the present disclosure being merely illustrative of one, but not the only, embodiment of the invention.

Having thus described the invention, what is claimed as new and useful and is desired to be secured by Letters Patent is:

1. A device of the class described comprising a tank, a pump chamber secured to the tank, said pump chamber having inlet and discharge openings therein, a piston working in said pump chamber, a piston rod having its upper end guided at the top of the tank and its lower end connected to said piston by a joint permitting angular displacement of the rod relative to the piston, and a resiliently supported piston-actuating mass operatively connected to said piston rod.

2. A device of the class described comprising a tank, a pump chamber secured to the tank, inlet and discharge valves communicating with said pump chamber, a piston working in said pump chamber, a guide sleeve secured to the top of the tank, a piston rod having its upper end sliding in said guide sleeve and its lower end connected to said piston by a joint permitting angular displacement of the rod relative to the piston, and a resiliently supported piston-actuating mass secured to said piston rod.

3. A device of the class described comprising a tank, a pump chamber secured to the bottom of the tank, inlet and discharge valves communicating with said pump chamber, a piston working in said pump chamber, a piston rod guide carried by the top cover of said tank, a piston rod having its upper end slidably mounted in said guide and its lower end connected to said piston by a joint permitting angular displacement of the rod relative to said piston, and a resiliently supported piston-actuating mass fastened to said piston rod.

4. A device of the class described comprising a tank, a pump chamber secured to said tank, said pump chamber having inlet and outlet openings communicating therewith, a piston working in said pump chamber, a piston rod having its lower end connected to said piston by a joint permitting angular displacement of the rod relative to the piston, a resiliently supported, piston-actuating mass operatively connected to said rod, and a guide for said piston rod independent of said mass.

5. A device of the class described comprising a tank, a pump chamber secured to the bottom of the tank, inlet and discharge valves communicating with said chamber, a piston working in said pump chamber, a piston-actuating mass resiliently supported within said tank, and a piston rod passing axially through said mass and secured thereto, the upper end of said rod being slidably guided in the top of the tank and the lower end being connected to said piston by a joint permitting angular displacement of the rod relative to the piston.

6. A device of the class described comprising a tank, a pump chamber secured to said tank, an inlet valve communicating with said pump chamber, a piston working in said chamber and having a valve-controlled discharge passage, a piston rod connected to said piston by a joint permitting angular displacement of said rod relative to said piston, a resiliently supported, piston-actuating mass within said tank and connected to the piston rod, and means whereby change in the locus of movement of said mass and piston, caused by the displacement of liquid by said mass when the liquid rises in the tank to the level of said mass, varies the discharge from said pump chamber.

7. A device of the class described comprising a tank, a pump chamber secured to said tank, an inlet valve communicating with said pump chamber, a piston working in said chamber and having a valve-controlled discharge passage, the wall of said pump chamber having a discharge port normally in coacting relationship with said discharge passage, a piston rod connected to said piston by a joint permitting angular displacement of said rod relative to the piston, and a resiliently supported, piston-actuating mass within said tank, and connected to the piston rod, said discharge port being so located that the change in the locus of movement of said mass and piston, caused by the displacement of liquid by said mass when the liquid rises in the tank to the level of the mass, shifts the discharge passage out of coacting relationship with the discharge port.

8. A device of the class described comprising a tank, a pump chamber secured to the tank, an inlet valve communicating with said pump chamber, a piston working in said pump chamber and having a valve-controlled discharge passage, the wall of said chamber having a discharge port, a piston rod connected to said piston by a joint permitting angular displacement of said rod relative to the piston, a piston-actuating mass connected to said piston rod, and a spring supporting said mass within the tank and, when the tank is subjected to vibration, imparting reciprocating motion to said piston in a locus of movement such that said discharge port and passage are in coacting relationship, said locus of movement being changed, due to the liquid displaced by said mass when the liquid rises in the tank to the level of the mass, so as to shift the discharge passage out of coacting relationship with said port.

9. A device of the class described comprising a tank, a pump chamber secured to said tank, inlet and discharge valves communicating with said chamber, a piston working in said chamber, and a resiliently supported piston-actuating mass connected to said piston by a joint permitting angular displacement between said piston and mass, said mass consisting of a containing shell having a plurality of metallic elements secured therein.

10. A device of the class described comprising a tank, a pump chamber secured to said tank, inlet and discharge valves communicating with said chamber, a piston working in said chamber, a piston rod connected to said piston by a joint permitting angular displacement between said rod and piston, and a resiliently supported, piston-actuating mass consisting of a containing shell and a plurality of metallic elements secured therein, said piston rod extending through said containing shell and being secured thereto.

11. A device of the class described comprising a tank, a pump chamber secured to said tank, an inlet valve communicating with said chamber, a piston working in said chamber, said piston being hollow and having a transverse partition provided with a valve seat, a discharge valve cooperating with said seat, the wall of said piston being provided with a discharge port above said valve seat, a piston rod having one end inserted in and connected to the upper portion of said piston, and a resiliently supported, piston-actuating mass connected to said piston rod.

12. A device of the class described comprising a tank, a pump chamber secured to said tank, and inlet valve communicating with said chamber, a piston working in said chamber, said piston being hollow and having a transverse partition provided with a valve seat, a discharge valve cooperating with said seat, said piston having an internal shoulder above said valve seat, a valve check having a flange seated upon said shoulder, a piston rod having one end inserted within and secured to the piston and engaging the valve check to hold it to its seat, and a resiliently supported, piston-actuating mass connected to said piston rod.

13. A device of the class described comprising a tank, a pump chamber secured to said tank, an inlet valve communicating with said pump chamber, a hollow piston enclosed in said pump chamber, said piston having a transverse partition provided with a valve seat, a discharge valve cooperating with said seat, the wall of said piston being provided with a discharge port above said valve seat and said pump chamber having a discharge port in the wall thereof cooperating with the discharge port in the piston wall, a piston rod having one end connected to said piston, and a resiliently supported piston-actuating mass connected to said piston rod.

14. A device of the class described comprising a tank, a pump chamber secured thereto, an inlet valve communicating with said pump chamber, a piston working in said pump chamber, said piston being hollow and having a transverse partition provided with a valve seat, a discharge valve cooperating with said valve seat, the wall of said piston being provided with an external groove and a discharge port above said valve seat and communicating with said groove, a piston rod having one end inserted in and secured to said piston, and a resiliently supported piston-actuating mass connected to said piston rod.

15. A device of the class described comprising a tank, a pump cylinder extending through and secured to the bottom of said tank, said cylinder being provided with an internal shoulder near the lower end thereof, a tubular valve check positioned within said cylinder and having a flange seated on said shoulder, a valve member positioned within said pump cylinder in engagement with said flange and provided with a valve seat, an inlet valve cooperating with said valve seat, a coupling member secured upon the lower end of the pump cylinder and forcing said valve member against said flange to retain the valve member and tubular valve check in place in said cylinder, a piston working in said cylinder, a discharge valve for said cylinder, and means for actuating said piston.

16. A device of the class described comprising a tank, a pump cylinder secured to said tank, said cylinder having inlet and discharge openings communicating therewith, a piston working in said cylinder, a resiliently supported piston-actuating mass operatively connected to said piston, and a tube secured to said tank and forming a well within which the pump cylinder is located.

17. A device of the class described comprising a tank, a pump cylinder secured to said tank, inlet and discharge valves communicating with said cylinder, a piston working in said cylinder, a resiliently supported piston-actuating mass connected to said piston, and a tube secured to the bottom of the tank and forming a well within which said pump cylinder is located, said tube having an annular inwardly-extending rib formed therein engaging the outer wall of said cylinder and positioning the tube in spaced relation thereto.

18. A device of the class described comprising a tank, a pump chamber secured to the base of said tank, inlet and discharge valves communicating with said chamber, a piston adapted for reciprocation within said chamber, and a piston actuating mass connected to said piston and adapted to reciprocate the same, said mass comprising a containing shell having a plurality of metallic elements therein, said elements having a density greater than that of the containing shell.

19. In a device of the class described comprising a tank, a pump chamber having an inlet secured within said tank, an outlet valve communicating with said pump chamber, a piston working in said pump chamber, a piston rod connected to said piston by a joint permitting angular displacement of the rod relative to the piston, means to guide the upper end of said piston rod and a resiliently supported mass operatively connected to said piston rod.

20. In a fuel supply system the combination of a casing and a pump within said casing, said pump comprising a weighted plunger, resilient means adapted to normally maintain said plunger in a predetermined position, a cylinder in which said plunger is adapted to have axial movement, said cylinder being positioned at the base of said casing, a piston secured to said plunger, said piston having an annular wall, an outlet valve positioned in said piston, an inlet valve positioned in the base of said cylinder, a tube in said pump cylinder intermediate said valves, said tube forming with the inner wall of said cylinder an annular pocket in which the annular wall of the piston is adapted to have axial movement whereby movement of said piston splashes liquid upon said valve.

21. In a fuel supply system the combination of a casing, a cylinder positioned within said casing, an inlet connection communicating with said casing, an inlet valve in said connection, a piston axially movable within said cylinder and adapted by its movement to cause pumping action therewithin, said piston having an annular extension forming a cup-shaped cavity therewithin, a valve in said piston adjacent said extension, a tube positioned in the cylinder between said valves forming with said cylinder an annular pocket in which the annular extension of the piston is adapted to have movement, and means for operating said piston, said tube having a smaller diameter than the inside of said tubular extension whereby an annular space is provided between said piston and tube.

22. In a fuel supply system the combination of a casing, a cylinder positioned within said casing, an inlet connection communicating with said casing, an inlet valve in said connection, a piston axially movable with said cylinder and adapted by its movement to cause pumping action therewithin, said piston having an annular extension forming a cup-shaped cavity therewith, a valve in said piston, a tube positioned in the cylinder between said valves forming with said cylinder an annular pocket in which the annular extension of the piston is adapted to have movement, an axially movable weighted element secured to the piston and having a normal position, and resilient means adapted to maintain said weighted element in normal position.

In testimony whereof, I affix my signature.

CARL P. BROCKWAY.

CERTIFICATE OF CORRECTION.

Patent No. 1,737,356.                                           Granted November 26, 1929, to

CARL P. BROCKWAY.

It is hereby certified that error appears in the printed specification of the above numbered patent requiring correction as follows: Page 3, line 102, after the word "rises" insert the words and comma "above the bottom of the mass 25," and lines 103 and 104, strike out the words and comma "when the liquid in the tank rises to a level of the mass,"; and that the said Letters Patent should be read with these corrections therein that the same may conform to the record of the case in the Patent Office.

Signed and sealed this 6th day of May, A. D. 1930.

M. J. Moore,
Acting Commissioner of Patents.

(Seal)